United States Patent [19]

Nusser et al.

[11] Patent Number: 5,554,732
[45] Date of Patent: Sep. 10, 1996

[54] FIBRE-REACTIVE DISAZO DYESTUFFS

[75] Inventors: Rainer Nusser, Müllheim, Germany; Roland Wald, Huningue, France

[73] Assignee: Sandoz Ltd, Basel, Switzerland

[21] Appl. No.: 431,651

[22] Filed: May 2, 1995

Related U.S. Application Data

[63] Continuation of Ser. No. 106,003, Aug. 13, 1993, abandoned.

[30] Foreign Application Priority Data

Aug. 14, 1992 [DE] Germany .......................... 42 26 918.0

[51] Int. Cl.$^6$ .......................... C09B 62/03; C09B 62/25; C09B 62/09; C09B 31/043; D06P 3/66; D06P 3/10
[52] U.S. Cl. .......................... 534/637; 534/632; 534/634; 534/638
[58] Field of Search .......................... 534/632, 637, 534/634, 638

[56] References Cited

U.S. PATENT DOCUMENTS

| | | | |
|---|---|---|---|
| 3,336,283 | 8/1967 | Weissauer | 534/627 X |
| 3,669,951 | 6/1972 | Bien et al. | 534/627 |
| 4,314,818 | 2/1982 | Courtin | 534/637 X |
| 4,460,505 | 7/1984 | Schundehutte et al. | 534/637 |
| 4,647,286 | 3/1987 | Seitz | 534/634 X |
| 4,818,247 | 4/1989 | Tzikas et al. | 8/549 |
| 4,990,599 | 2/1991 | Mausezahl et al. | 534/634 |
| 5,227,476 | 7/1993 | Doswald et al. | 534/634 |
| 5,227,477 | 7/1993 | Auerbach et al. | 534/634 |

FOREIGN PATENT DOCUMENTS

| | | | |
|---|---|---|---|
| 365486 | 4/1990 | European Pat. Off. | 534/634 |
| 443165 | 8/1991 | European Pat. Off. | 534/632 |
| 513622 | 11/1992 | European Pat. Off. | 534/632 |
| 526792 | 2/1993 | European Pat. Off. | 534/632 |
| 525572 | 2/1993 | European Pat. Off. | 534/632 |
| 2076006 | 11/1981 | United Kingdom | 534/637 |

Primary Examiner—Floyd D. Higel
Attorney, Agent, or Firm—Robert S. Honor; Carl W. Battle; Gabriel Lopez

[57] ABSTRACT

Fibre-reactive disazo compounds of the formula

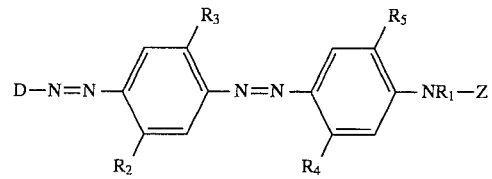

which compounds are in free acid or salt form, and mixtures thereof, are useful for dyeing or printing hydroxy group- or nitrogen-containing organic substrates, for example leather and fibre material comprising natural or synthetic polyamides or natural or regenerated cellulose; the most preferred substrate is a textile material comprising cotton.

15 Claims, No Drawings

FIBRE-REACTIVE DISAZO DYESTUFFS

This is a continuation of application Ser. No. 08/106,003, filed Aug. 13, 1993, abandoned.

This invention relates to fibre-reactive disazo compounds and processes for their production. These compounds are suitable for use as fibre-reactive dyestuffs in any conventional dyeing or printing processes.

More particularly, the invention provides compounds of formula I

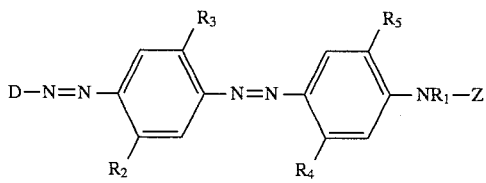

and salts thereof, or a mixture of such compounds or salts, in which each $R_1$ is independently hydrogen, $C_{1-4}$alkyl or substituted $C_{1-4}$alkyl, each of $R_2$ and $R_4$ is independently hydrogen, $C_{1-4}$alkyl, $C_{1-4}$alkoxy, —NHCOC$_{1-4}$alkyl or —NHCONH$_2$, each of $R_3$ and $R_5$ is independently hydrogen, $C_{1-4}$alkyl or $C_{1-4}$alkoxy, and Z is

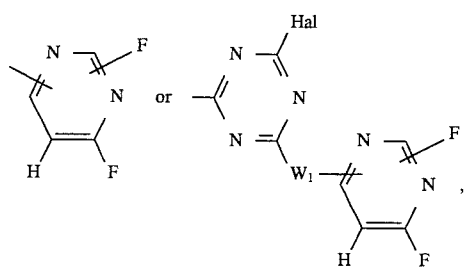

in which

Hal is fluorine or chlorine, and $W_1$ is

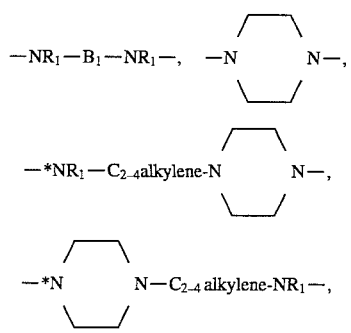

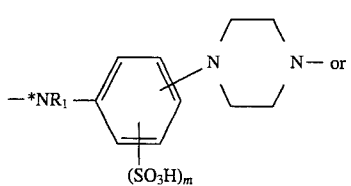

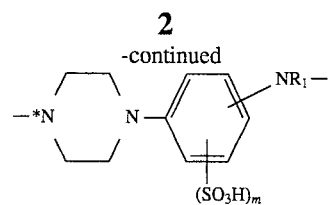

wherein each m is independently 0 or 1 and the marked nitrogen atom is bound to a carbon atom of the triazine ring, $B_1$ is $C_{2-4}$alkylene; —$C_{2-3}$alkylene—Q—$C_{2-3}$alkylene- in which Q is —O— or —NR$_1$—; $C_{3-4}$alkylene monosubstituted by hydroxy,

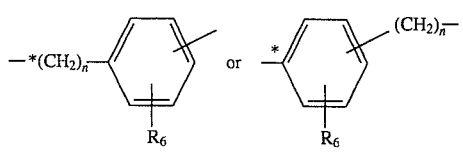

in which n is 0 or an integer 1 to 4, $R_6$ is hydrogen, $C_{1-4}$alkyl, $C_{1-4}$alkoxy, carboxy or sulpho, and the marked carbon atom is attached to the —NR$_1$ group which is bound to a carbon atom of the triazine ring;

D is one of the radicals (a) to (d),

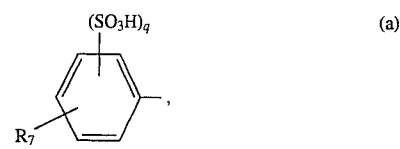

(a)

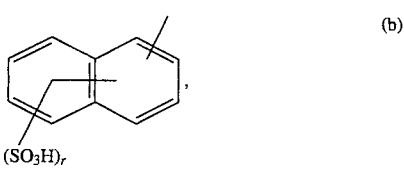

(b)

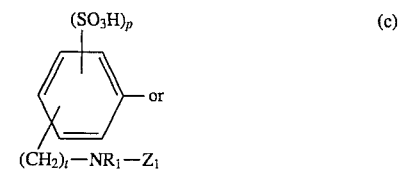

(c)

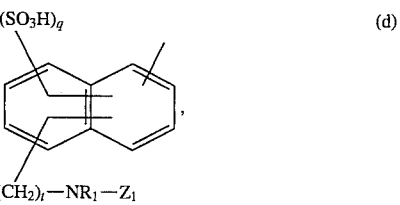

(d)

in which $R_7$ is hydrogen, $C_{1-4}$alkyl, $C_{1-4}$alkoxy, carboxy or —NHCOCH$_3$, p is 0, 1 or 2, q is 1 or 2, r is 1, 2 or 3, t is 0 or 1, and $Z_1$ is

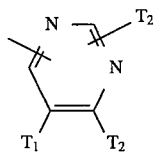

wherein $T_1$ is hydrogen, chloro or cyano, and the two $T_2$'s are the same and each is fluoro or chloro.

In the specification, any alkyl, alkoxy or alkylene group present is linear or branched unless indicated otherwise. In any hydroxysubstituted alkyl or alkylene group which is attached to a nitrogen atom, the hydroxy group is preferably bound to a carbon atom which is not directly attached to the nitrogen atom. In any alkylene chain interrupted by Q which is attached to a nitrogen atom, Q is preferably bound to a carbon atom which is not directly attached to the nitrogen atom.

When $R_1$ is a substituted alkyl group, it is preferably monosubstituted by hydroxy, cyano or chloro.

Each $R_1$ is preferably $R_{1a}$, where each $R_{1a}$ is independently hydrogen, methyl, ethyl or 2-hydroxyethyl; more preferably each $R_1$ is $R_{1b}$, where each $R_{1b}$ is independently hydrogen or methyl. Most preferably each $R_1$ is hydrogen.

$R_2$ and $R_4$ are preferably $R_{2a}$ and $R_{4a}$, where each of $R_{2a}$ and $R_{4a}$ is independently hydrogen, methyl, methoxy, —NHCOCH$_3$ or —NHCONH$_2$. $R_2$ and $R_4$ are more preferably $R_{2b}$ and $R_{4b}$, where each of $R_{2b}$ and $R_{4b}$ is independently hydrogen or methyl; most preferably $R_4$ is hydrogen.

$R_3$ is preferably $R_{3a}$, where $R_{3a}$ is hydrogen, methyl or methoxy.

$R_5$ is preferably $R_{5a}$, where $R_{5a}$ is hydrogen or methyl; most preferably $R_5$ is hydrogen.

Hal is most preferably chlorine.

$R_6$ is preferably $R_{6a}$, where $R_{6a}$ is hydrogen, methyl, methoxy, carboxy or sulpho; more preferably it is $R_{6b}$, where $R_{6b}$ is hydrogen or sulpho.

$B_1$ is preferably $B_{1a}$, where $B_{1a}$ is $C_{2-3}$alkylene, —CH$_2$CH$_2$—NR$_{1a}$—CH$_2$CH$_2$—, monohydroxy-substituted $C_{3-4}$alkylene,

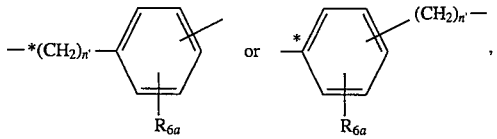

in which n' is 0 or 1.

$B_1$ is more preferably $B_{1b}$, where $B_{1b}$ is $C_{2-3}$alkylene, —CH$_2$CH$_2$—NR$_{1b}$—CH$_2$CH$_2$—, monohydroxy-substituted $C_{3-4}$alkylene or

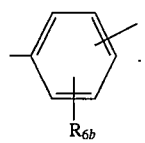

$B_1$ is most preferably $B_{1c}$, where $B_{1c}$ is

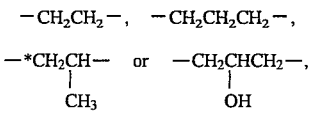

in which the marked carbon atom is bound to the —NR$_1$ group which is attached to a carbon atom of the triazine ring.

$W_1$ is preferably $W_{1a}$, where $W_{1a}$ is

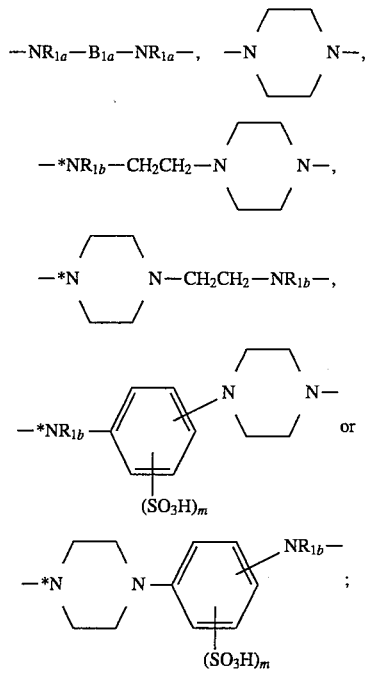

more preferably it is $W_{1b}$, where $W_{1b}$ is

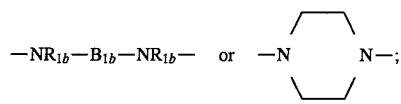

most preferably $W_1$ is $W_{1c}$, where $W_{1c}$ is —NH—B$_{1c}$—NH—.

$R_7$ is preferably $R_{7a}$, where $R_{7a}$ is hydrogen, methyl, methoxy or carboxy. $R_7$ is most preferably hydrogen.

$Z_1$ is preferably $Z_1'$, where $Z_1'$ is a radical

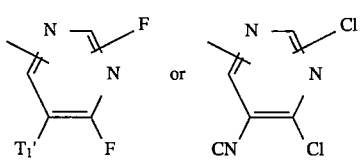

in which $T_1'$ is hydrogen or chloro. Most preferably $Z_1$ is

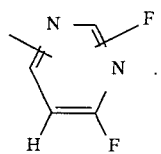

D is preferably $D_a$, where $D_a$ is one of the radicals (a') to (d')

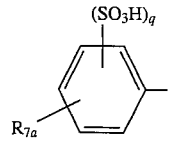 (a')

in which $R_{7a}$ is more preferably hydrogen;

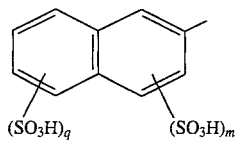 (b')

in which m is independently 0 or 1,
q is 1 or 2, and
m+q is 2 or 3;

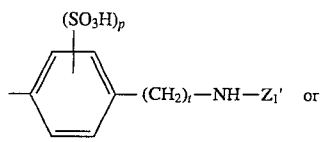 (c')

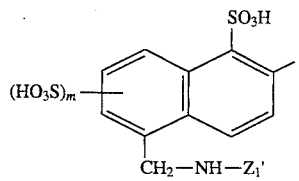 (d')

in which m is independently 0 or 1.

Most preferably, in each (c') and (d') $Z_1'$ is

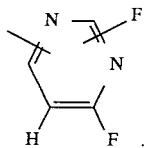

Preferred compounds of formula I are those in which D is a radical (a'); or those in which D is a radical (c') in which t is 1, or (d').

More preferred compounds of formula I correspond to formula Ia

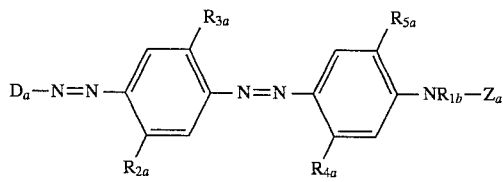

and salts thereof, in which $D_a$, $R_{2a}$ to $R_{5a}$ and $R_{1b}$ are as defined above, and $Z_a$ is

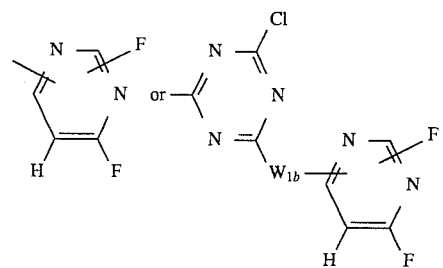

in which $W_{1b}$ is as defined above.

Even more preferred are compounds of formula Ia in which (1) $R_{1b}$ is hydrogen;
(2) $R_{2a}$ is $R_{2b}$ and $R_{4a}$ is $R_{4b}$;
(3) those of (2) in which $R_{4a}$ and $R_{5a}$ are hydrogen;
(4) $W_{1b}$ is $W_{1c}$;
(5) those of (1) to (4) in which $D_a$ is a radical (a') in which $R_{7a}$ is hydrogen;
(6) those of (1) to (4) in which $D_a$ is a radical (c') or (d') in which $Z_1'$ is

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds according to formula I or mixtures thereof:

Compounds of formula I in which D is a radical (a) or (b) are prepared comprising reacting 1 mole of a compound of formula IIa or IIb,

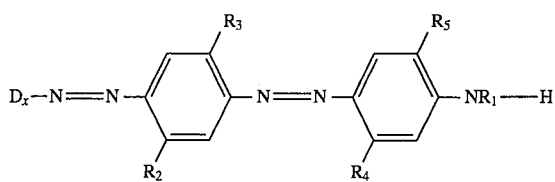
IIa

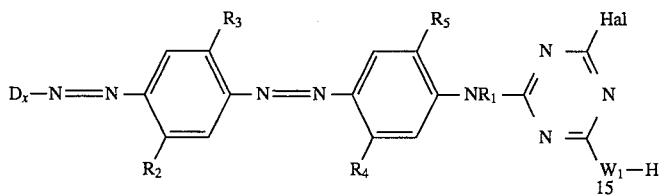
IIb in which $R_1$ to $R_5$, Hal and $W_1$ are as defined above and $D_x$ is a radical (a) or (b) defined above,
with at least 1 mole of 2,4,6-trifluoropyrimidine;

compounds of formula I in which D is a radical (c) or (d) are prepared comprising reacting 1 mole of a compound of formula III,

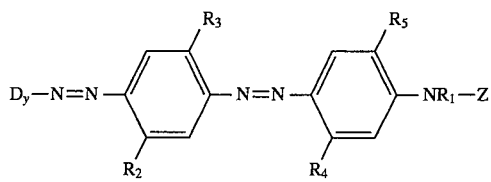
III in which $R_1$ to $R_5$ and Z are as defined above and $D_y$ is

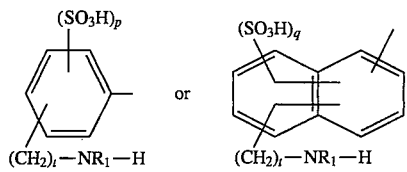

in which $R_1$, p, q and t are as defined above,
with 1 mole of a compound $Z_1$-Hal in which $Z_1$ is as defined above and Hal is fluorine or chlorine.

Furthermore, compounds of formula I in which D is a radical (c) or (d) and Z and $Z_1$ are both

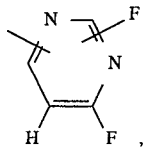

may be prepared comprising reacting 1 mole of a compound of formula IV,

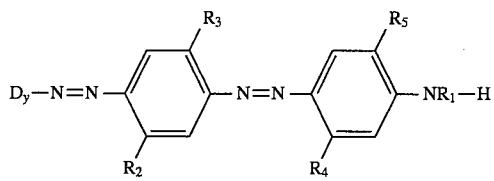
IV in which $R_1$ to $R_5$ and $D_y$ are as defined above,
with at least 2 moles of 2,4,6-trifluoropyrimidine.

These condensation reactions are carried out in accordance with known methods, preferably in a temperature range of from 20° to 50° C., more preferably at 30°–40° C., and at pH 4–5.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that any group Z or $Z_1$ corresponding to the formula

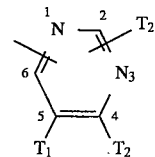

in which $T_1$ is hydrogen, cyano or chloro and $T_2$ is fluoro or chloro, can occur in two isomeric forms, with the floating substituent $T_2$ in either the 2- or the 6-position.

In general, it is preferred to use this mixture of resulting dyestuffs as it is without resorting to the isolation of a single isomer for use, but should this be desired it can be readily achieved by conventional methods.

The starting compounds of formulae IIa, IIb, III and IV are either known or may be readily made from known starting materials by known methods using conventional diazotising, coupling and/or condensation reactions.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of 30° to 80° C., particularly at 50°–60° C., whereby a liquor to goods ratio of 6:1 to 30:1 is used and more preferably of 10:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

The following examples illustrate the invention. In the examples all parts and percentages are by weight unless indicated to the contrary, and all temperatures are given in degrees Centigrade.

EXAMPLE 1

30.3 Parts of 2-aminonaphthalene-1,6-disulphonic acid are dissolved in 250 parts of water and a solution of a pH less than 1 is obtained. Diazotisation is effected by adding 25 parts of a 4N sodium nitrite solution at 0°–5°. The diazonium compound thus obtained is reacted at 0°–5° and at pH 5 with 13.7 parts of 1-amino-2-methoxy-5-methylbenzene. After the reaction is completed, a second diazotisation step is carried out by the addition of 50 parts by volume of 30% hydrochloric acid with 25 parts by volume of a 4N sodium nitrite solution. Subsequently, at a temperature not over 10° and at pH 4.5, 20.5 parts of aniline-ω-methanesulphonic acid are poured thereto all at once. After the coupling reaction is complete (which is monitored by thin layer chromatography), the pH of the reaction mixture is adjusted to 13 by adding 30% sodium hydroxide solution. The mixture is then heated to 30°, and 17 parts by volume of a 40% hydrogen peroxide solution are slowly added dropwise. After saponification is complete, the amino group which has been set free is reacted with 14.7 parts of 2,4,6-trifluoropyrimidine at 35° and pH 4.5. The dyestuff thus obtained corresponds to the formula (shown in free acid form)

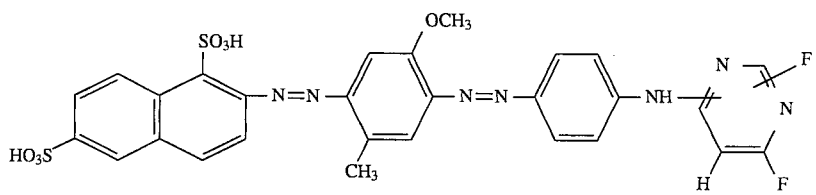

and can be isolated in conventional manner by salting out from the reaction mixture. It dyes cotton in orange shades. These cotton dyeings exhibit good fastness properties and are resistant to oxidative influences.

EXAMPLE 2

To a solution containing 44 parts of the compound of the formula

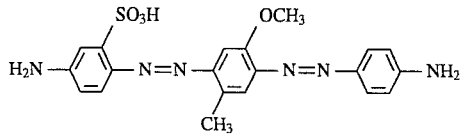

in 500 parts of water, a corresponding amount of 30% hydrochloric acid is added to adjust to a pH of 4.3 to 4.8. Afterwards 29.4 parts of 2,4,6-trifluoropyrimidine are added dropwise at 20° whilst maintaining a pH of 4.3 to 4.8 by the addition of 20% sodium carbonate solution. Simultaneously, the temperature is raised to 40°. After the reaction has been completed, the dyestuff obtained is salted out from the reaction medium, filtered off and dried at 50° under vacuum. With the dyestuff obtained which corresponds to the formula

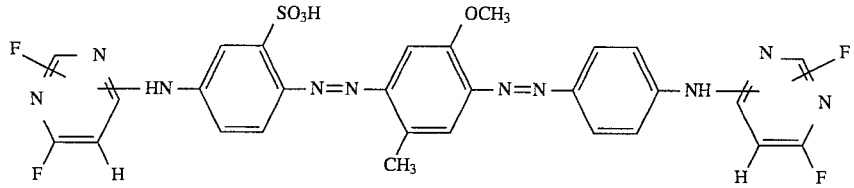

orange dyeings or prints can be made which exhibit high light- and wet-fastness properties and are resistant to oxidative influences.

EXAMPLES 3 TO 49

By analogy with the method described in Example 1 or 2, using appropriate starting compounds, further compounds of formula I may be prepared which are listed in the following Tables 1 and 2. They correspond to the formulae (T1) and (T2),

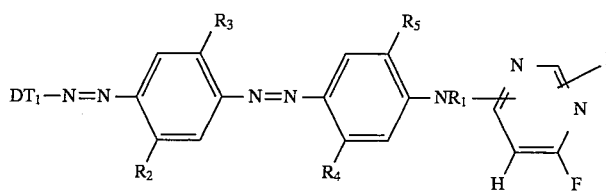

(T1)

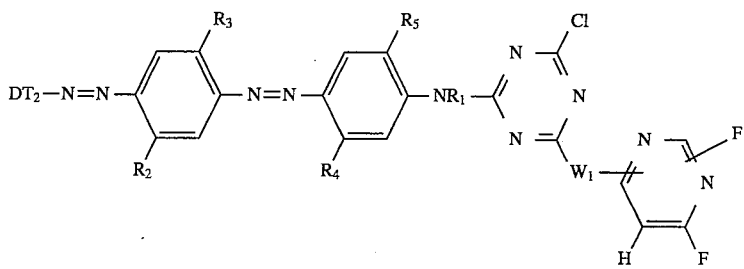

(T2)

in which the symbols are as defined in Tables 1 and 2.

In Table 2, in the column of $-W_1-$ the marked nitrogen atom is attached to a carbon atom of the triazine ring.

Furthermore, the following symbols $ZT_a$ to $ZT_c$ are used in the Tables, where

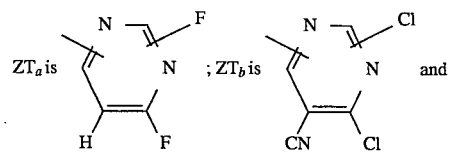

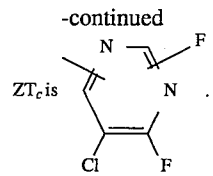

The compounds of Examples 3 to 49 may be applied to substrates which comprise cellulose fibres, and particularly to textile material comprising cotton using the conventional exhaust dyeing method or conventional printing processes, where dyeings or prints in orange shades are obtained. These dyeings and prints on cotton show good light- and wet-fastness properties and are resistant to oxidative influences.

TABLE 1

Compounds of formula (T1)
Examples 3 to 23

| Ex. No. | $DT_1$ | $R_2$ | $R_3$ | $R_4$ | $R_5$ | $R_1$ |
|---|---|---|---|---|---|---|
| 3 | ![naphthalene with SO3H at 1, HO3S at 6] SO₃H / HO₃S-naphthalene | H | H | H | H | H |
| 4 | ![naphthalene with SO3H, HO3S] SO₃H / HO₃S-naphthalene | CH₃ | H | H | H | H |
| 5 | ![benzene with SO3H, SO3H] | H | H | H | CH₃ | H |
| 6 | ![benzene with SO3H, SO3H] | CH₃ | H | CH₃ | H | CH₃ |

TABLE 1-continued

Compounds of formula (T1)
Examples 3 to 23

| Ex. No. | $DT_1$ | $R_2$ | $R_3$ | $R_4$ | $R_5$ | $R_1$ |
|---|---|---|---|---|---|---|
| 7 | 2,5-disulfophenyl (benzene with $SO_3H$ at positions 2 and 5) | —NHCOCH$_3$ | H | H | H | H |
| 8 | 3,6,8-trisulfo-naphthyl | H | H | CH$_3$ | H | H |
| 9 | 3,6,8-trisulfo-naphthyl | H | OCH$_3$ | H | H | H |
| 10 | 3,6,8-trisulfo-naphthyl (1,3,6-trisulfo isomer) | H | H | H | H | H |
| 11 | 3,6,8-trisulfo-naphthyl | —NHCOCH$_3$ | H | H | H | H |
| 12 | 3,6,8-trisulfo-naphthyl | —NHCONH$_2$ | H | H | H | H |
| 13 | 3,6,8-trisulfo-naphthyl | CH$_3$ | OCH$_3$ | H | H | H |
| 14 | 4-(NH—ZT$_a$)phenyl | CH$_3$ | OCH$_3$ | CH$_3$ | H | H |
| 15 | 4-(NH—ZT$_b$)phenyl | CH$_3$ | OCH$_3$ | CH$_3$ | H | H |

TABLE 1-continued

Compounds of formula (T1)
Examples 3 to 23

| Ex. No. | DT$_1$ | R$_2$ | R$_3$ | R$_4$ | R$_5$ | R$_1$ |
|---|---|---|---|---|---|---|
| 16 | 3-(NH—ZT$_a$)-5-SO$_3$H-phenyl | CH$_3$ | OCH$_3$ | H | H | H |
| 17 | 4-(CH$_2$NH—ZT$_a$)-phenyl | CH$_3$ | OCH$_3$ | H | H | H |
| 18 | 4-(CH$_2$NH—ZT$_c$)-phenyl | CH$_3$ | OCH$_3$ | H | H | H |
| 19 | 3-(CH$_2$NH—ZT$_a$)-5-SO$_3$H-phenyl | CH$_3$ | OCH$_3$ | H | H | H |
| 20 | 1-SO$_3$H-5-(CH$_2$NH—ZT$_a$)-naphthyl | CH$_3$ | OCH$_3$ | H | H | H |
| 21 | 1-SO$_3$H-5-(CH$_2$NH—ZT$_a$)-naphthyl | H | H | H | H | H |
| 22 | 1-SO$_3$H-5-(CH$_2$NH—ZT$_a$)-naphthyl | CH$_3$ | CH$_3$ | H | H | CH$_3$ |
| 23 | 1-SO$_3$H-5-(CH$_2$NH—ZT$_c$)-naphthyl | H | H | H | H | H |

TABLE 2

Compounds of formula (T2)
Examples 24 to 49

| Ex. No. | $DT_2$ | $R_2$ | $R_3$ | $R_4$ | $R_5$ | $R_1$ | $-W_1-$ |
|---|---|---|---|---|---|---|---|
| 24 | naphthalene with $SO_3H$, $HO_3S$, $SO_3H$ | $CH_3$ | H | $CH_3$ | H | H | $-NHCH_2CH(OH)CH_2NH-$ |
| 25 | naphthalene with $SO_3H$, $HO_3S$, $SO_3H$ | $-NHCOCH_3$ | H | H | H | H | $-NHCH_2CH_2CH_2NH-$ |
| 26 | $-NHCH_2CH(OH)CH_2NH-$ | $CH_3$ | H | H | H | H | $-*NHCH_2CH_2CH_2N(CH_3)-$ |
| 27 | benzene with $SO_3H$, $SO_3H$ | H | H | H | H | H | $-*NHCH_2CH_2CH_2N(CH_3)-$ |
| 28 | benzene with $SO_3H$, $SO_3H$ | $CH_3$ | H | $CH_3$ | H | $CH_3$ | $-*NHCH_2CH_2CH_2N(CH_3)-$ |
| 29 | benzene with $SO_3H$, $SO_3H$ | $CH_3$ | $OCH_3$ | H | H | H | $-NHCH_2CH(OH)CH_2NH-$ |
| 30 | naphthalene with $SO_3H$, $HO_3S$, $SO_3H$ | $CH_3$ | H | H | H | H | $-NHCH_2CH(OH)CH_2NH-$ |
| 31 | naphthalene with $SO_3H$, $HO_3S$, $SO_3H$ | H | H | H | H | H | $-*NHCH_2CH_2CH_2N(CH_3)-$ |
| 32 | naphthalene with $SO_3H$, $HO_3S$, $SO_3H$ | $CH_3$ | H | H | H | H | $-*NHCH_2CH(CH_3)NH-$ |

TABLE 2-continued

Compounds of formula (T2)
Examples 24 to 49

| Ex. No. | $DT_2$ | $R_2$ | $R_3$ | $R_4$ | $R_5$ | $R_1$ | $-W_1-$ |
|---|---|---|---|---|---|---|---|
| 33 | naphthalene with $SO_3H$ (1,5), $HO_3S$ (3-position), $SO_3H$ (other) | $CH_3$ | $OCH_3$ | H | H | H | $-*NHCH_2CHNH-$ <br> $\|$ <br> $CH_3$ |
| 34 | naphthalene with $SO_3H$, $HO_3S$, $SO_3H$ | H | H | H | H | H | $-*NHCH_2CHNH-$ <br> $\|$ <br> $CH_3$ |
| 35 | benzene with $SO_3H$ (ortho) and $SO_3H$ (para) | $CH_3$ | $OCH_3$ | H | H | H | $-*NHCH_2CHNH-$ <br> $\|$ <br> $CH_3$ |
| 36 | naphthalene with $SO_3H$ (1,5-positions) | H | H | H | H | H | $-*NHCH_2CHNH-$ <br> $\|$ <br> $CH_3$ |
| 37 | benzene with $SO_3H$ and $HO_3S$ | $-NHCOCH_3$ | H | H | H | H | $-NHCH_2CH_2CH_2NH-$ |
| 38 | benzene with $HO_3S$ | $-NHCONH_2$ | H | H | H | H | $-*NHCH_2CHNH-$ <br> $\|$ <br> $CH_3$ |
| 39 | phenyl—$NH-ZT_a$ | $CH_3$ | $OCH_3$ | H | H | H | $-*NHCH_2CHNH-$ <br> $\|$ <br> $CH_3$ |
| 40 | phenyl—$NH-ZT_a$ | $-NHCOCH_3$ | H | H | H | $CH_3$ | $-*NHCH_2CHNH-$ <br> $\|$ <br> $CH_3$ |
| 41 | phenyl—$NH-ZT_a$ | $-NHCOCH_3$ | H | $-NHCOCH_3$ | $CH_3$ | H | $-*NHCH_2CHNH-$ <br> $\|$ <br> $CH_3$ |
| 42 | phenyl—$NH-ZT_a$ with $SO_3H$ | H | H | $CH_3$ | H | $CH_3$ | $-NHCH_2CHCH_2NH-$ <br> $\|$ <br> $OH$ |

TABLE 2-continued

Compounds of formula (T2)
Examples 24 to 49

| Ex. No. | DT$_2$ | R$_2$ | R$_3$ | R$_4$ | R$_5$ | R$_1$ | —W$_1$— |
|---|---|---|---|---|---|---|---|
| 43 | ![benzene with NH—ZT$_a$ and SO$_3$H] | CH$_3$ | OCH$_3$ | H | H | H | —NHCH$_2$CHCH$_2$NH—<br>             \|<br>            OH |
| 44 | benzene with CH$_2$NH—ZT$_a$ and SO$_3$H | CH$_3$ | OCH$_3$ | —NHCONH$_2$ | H | H | —NHCH$_2$CHCH$_2$NH—<br>             \|<br>            OH |
| 45 | naphthalene with SO$_3$H and CH$_2$NH—ZT$_a$ | H | H | H | H | H | —NHCH$_2$CHCH$_2$NH—<br>             \|<br>            OH |
| 46 | naphthalene with SO$_3$H and CH$_2$NH—ZT$_a$ | CH$_3$ | OCH$_3$ | H | H | H | —*NHCH$_2$CHNH—<br>            \|<br>           CH$_3$ |
| 47 | benzene with NH—ZT$_c$ | CH$_3$ | OCH$_3$ | H | H | H | —*NHCH$_2$CHNH—<br>            \|<br>           CH$_3$ |
| 48 | benzene with NH—ZT$_b$ | CH$_3$ | H | CH$_3$ | H | CH$_3$ | —*NHCH$_2$CHNH—<br>            \|<br>           CH$_3$ |
| 49 | benzene with CH$_2$NH—ZT$_a$ | —NHCOCH$_3$ | H | H | H | CH$_3$ | —*NHCH$_2$CHNH—<br>            \|<br>           CH$_3$ |

By the preparation method described in Examples 1 and 2, the compounds of Examples 1–49 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, the dyestuffs of Examples 1 to 49 (and the corresponding free acids and other salt forms) contain two isomeric compounds regarding the radical

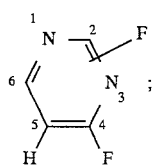

one compound in which the floating fluorine substituent on the pyrimidine ring is in the 2-position and the corresponding compound wherein it is in the 6-position. In an analogous manner also the radicals ZT$_b$ and ZT$_c$ are present in two appropriate isomeric forms with respect to the floating chloro or fluoro substituent. The obtained mixtures of isomeric dyestuffs may be used in conventional dyeing or printing processes; the isolation of a single isomer for use normally is unnecessary.

In the following examples, the application of the compounds of this invention is illustrated.

APPLICATION EXAMPLE A 0.3 Part of the dyestuff of Example 1 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is kept at 50°. Subsequently, the dyebath is heated to 60°, and dyeing is effected for a further one hour at 60°.

The dyed fabric is then rinsed with running cold water for 3 minutes and afterwards with running hot water for a further 3 minutes. The dyeing is washed at the boil for 15 minutes in 50 parts of demineralised water in the presence of 0.25 part of Marseille soaps. After being rinsed with running hot water (for 3 minutes) and centrifuged, the dyeing is dried in a cabinet dryer at about 70°. An orange cotton dyeing is obtained showing good fastness properties, and particularly high wet fastness properties, which is stable towards oxidative influences.

APPLICATION EXAMPLE B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 1 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying an orange cotton dyeing is obtained which has the same good fastness properties as indicated in Application Example A.

Similarly, the dyestuffs of Examples 2–49 or mixtures of the exemplified dyestuffs may be employed to dye cotton in accordance with the method described in Application Example A or B. The cotton dyeings thus obtained are orange and show good fastness properties.

APPLICATION EXAMPLE C

A printing paste consisting of

| | |
|---|---|
| 40 parts | of the dyestuff of Example 1 |
| 100 parts | of urea |
| 350 parts | of water |
| 500 parts | of a 4% sodium alginate thickener and |
| 10 parts | of sodium bicarbonate |
| 1000 parts | in all | is applied to cotton fabric in accordance with conventional printing methods.

The printed fabric is dried and fixed in steam at 102°–104° for 4–8 minutes. It is rinsed in cold land then hot water, washed at the boil (according to the method described in Application Example A) and dried. An orange print is obtained which has good general fastness properties.

Similarly, the dyestuffs of Examples 2 to 49 or mixtures of the exemplified dyestuffs may be employed to print cotton in accordance with the method given in Application Example C. All prints obtained are orange and show good fastness properties.

What is claimed is:

1. A compound of formula I

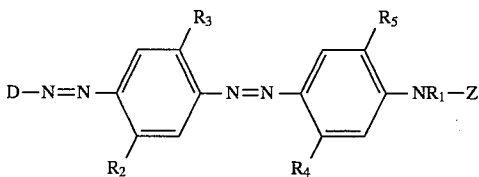

or a salt thereof, or a mixture of such compounds or salts, in which each $R_1$ is independently hydrogen, $C_{1-4}$alkyl or $C_{1-4}$alkyl, monosubstituted by hydroxy, cyano or chloro each of $R_2$ and $R_4$ is independently hydrogen, $C_{1-4}$alkyl, $C_{1-4}$alkoxy, —NHCOC$_{1-4}$alkyl or —NHCONH$_2$, each of $R_3$ and $R_5$ is independently hydrogen, $C_{1-4}$alkyl or $C_{1-4}$alkoxy, and Z is

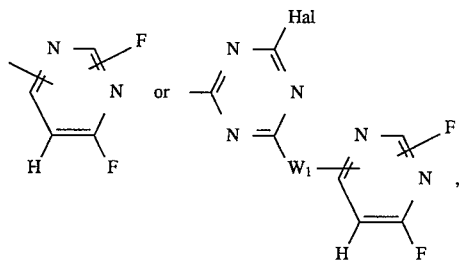

in which

Hal is fluorine or chlorine and $W_1$ is

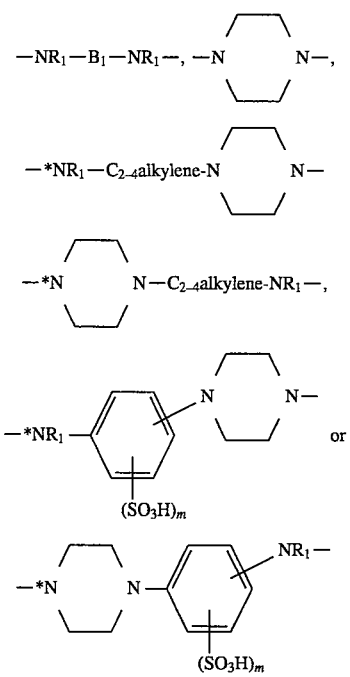

wherein each m is independently 0 or 1 and the marked nitrogen atom is bound to a carbon atom of the triazine ring, $B_1$ is $C_{2-4}$alkylene; —$C_{2-3}$alkylene—Q—$C_{2-3}$alkylene- in which Q is —O— or —NR$_1$—; $C_{3-4}$alkylene monosubstituted by hydroxy,

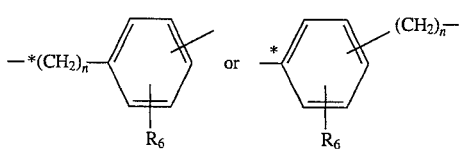

in which n is 0 or an integer 1 to 4, $R_6$ is hydrogen, $C_{1-4}$alkyl, $C_{1-4}$alkoxy, carboxy or sulpho, and the marked carbon atom is attached to the —$NR_1$ group which is bound to a carbon atom of the triazine ring;

D is one of the radicals (a) to (d),

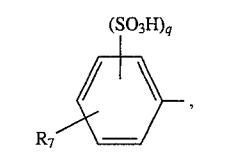 (a)

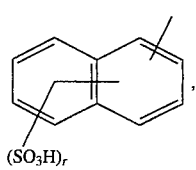 (b)

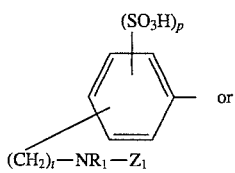 (c)

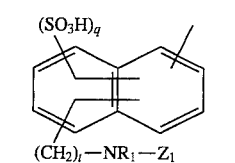 (d)

in which $R_7$ is hydrogen, $C_{1-4}$alkyl, $C_{1-4}$alkoxy, carboxy or 'NHCOCH$_3$, p is 0, 1 or 2, q is 1 or 2, r is 1, 2 or 3, t is 0 or 1, and $Z_1$ is

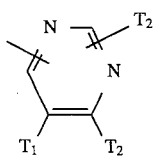

wherein $T_1$ is hydrogen, chloro or cyano, and the two $T_2$'s are the same and each is fluoro or chloro.

2. A compound according to claim 1, in which each $R_1$ is $R_{1a}$, where each $R_{1a}$ is independently hydrogen, methyl, ethyl or 2-hydroxyethyl.

3. A compound according to claim 1, in which $R_2$ an $R_4$ are $R_{2a}$ and $R_{4a}$, where each of $R_{2a}$ and $R_{4a}$ is independently hydrogen, methyl, methoxy, —NHCOCH$_3$ or —NH-CONH$_2$; $R_3$ is $R_{3a}$, where $R_{3a}$ is hydrogen, methyl or methoxy, and $R_5$ is $R_{5a}$, where $R_{5a}$ is hydrogen or methyl.

4. A compound according to claim 3, in which $R_4$ and $R_5$ are both hydrogen.

5. A compound according to claim 1, in which D is one of the radicals

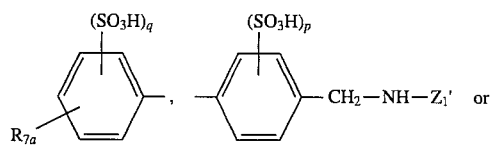

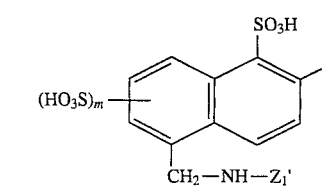

in which $R_{7a}$ is hydrogen, methyl, methoxy or carboxy, m is independently 0 or 1, p is 0, 1 or 2, q is 1 or 2, and $Z_1'$ is

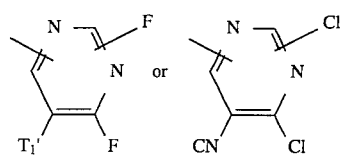

wherein $T_1'$ is hydrogen or chloro.

6. A compound according to claim 5, in which $Z_1'$ is

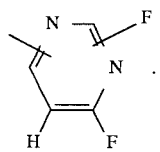

7. A compound according to claim 1, which corresponds to formula Ia

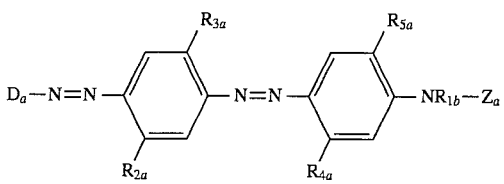 Ia or salts thereof, in which $D_a$ is one of the radicals (a') to (d'),

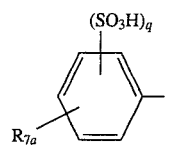 (a')

-continued

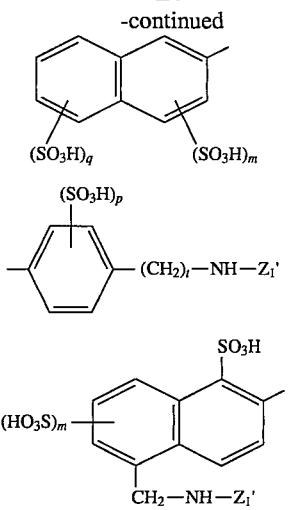

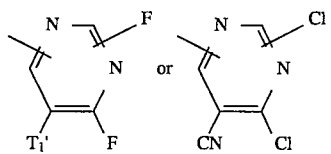

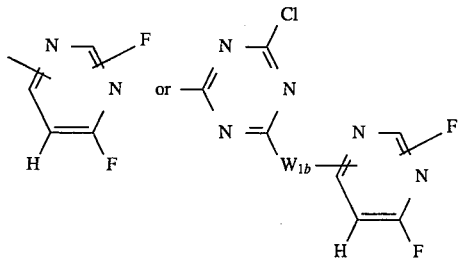

wherein $R_{7a}$ is hydrogen, methyl, methoxy or carboxy, m is independently 0 or 1, q is 1 or 2, and m+q is 2 or 3;

p is 0, 1 or 2, t is 0 or 1, and $Z_a$ is in which $T_1'$ is hydrogen or chloro;

each of $R_{2a}$ and $R_{4a}$ is independently hydrogen, methyl, methoxy, —NHCOCH$_3$ or —NHCONH$_2$, $R_{3a}$ is hydrogen, methyl or methoxy, $R_{5a}$ is hydrogen or methyl, $Z_a$ is in which (b') $W_{1b}$ is

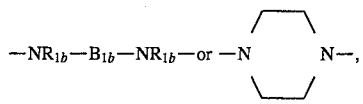

(c') wherein $B_{1b}$ is $C_{2-3}$alkylene, —CH$_2$CH$_2$—NR$_{1b}$—CH$_2$CH$_2$—, monohydroxy-substituted $C_{3-4}$alkylene or (d') 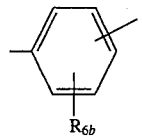

in which $R_{6b}$ is hydrogen or sulpho, and each $R_{1b}$ is independently hydrogen or methyl.

8. A compound according to claim 7, in which each $R_{1b}$ is hydrogen.

9. A compound according to claim 7, in which each of $R_{2a}$ and $R_{4a}$ is independently hydrogen or methyl.

10. A compound according to claim 9, in which each of $R_{4a}$ and $R_{5a}$ is hydrogen.

11. A compound according to claim 7, in which $W_{1b}$ is $W_{1c}$, where $W_{1c}$ is —NH—B$_{1c}$—NH—, in which B$_{1c}$ is

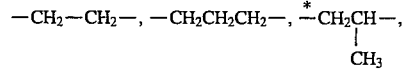

wherein the marked carbon atom is bound to the —NH group which is attached to a carbon atom of the triazine ring, or

12. A compound according to claim 7, in which $D_a$ is a radical (a') in which $R_{7a}$ is hydrogen.

13. A compound according to claim 7, in which $D_a$ is a radical (c') or (d') in which t is 1 and $Z_1'$ is

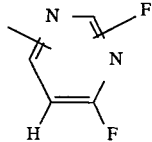

14. A process for dyeing or printing a hydroxy group- or nitrogen-containing organic substrate comprising applying to the substrate a compound of formula I defined in claim 1, or a mixture thereof.

15. A process according to claim 14, wherein the substrate is a fibre material comprising natural or regenerated cellulose.

* * * * *